US010395138B2

United States Patent
Stålring

(10) Patent No.: US 10,395,138 B2
(45) Date of Patent: Aug. 27, 2019

(54) IMAGE SEGMENTATION USING USER INPUT SPEED

(71) Applicant: Microsoft Technology Licensing, LLC, Redmond, WA (US)

(72) Inventor: Ernst Anders William Stålring, Lund (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/349,987

(22) Filed: Nov. 11, 2016

(65) Prior Publication Data
US 2018/0137623 A1   May 17, 2018

(51) Int. Cl.
*G06K 9/62* (2006.01)
*G06T 7/11* (2017.01)
*G06F 3/0488* (2013.01)
*G06K 9/36* (2006.01)

(52) U.S. Cl.
CPC ......... *G06K 9/6253* (2013.01); *G06K 9/6224* (2013.01); *G06K 9/6256* (2013.01); *G06T 7/11* (2017.01); *G06F 3/0488* (2013.01); *G06K 2009/366* (2013.01); *G06T 2207/20104* (2013.01)

(58) Field of Classification Search
None
See application file for complete search history.

(56) References Cited

U.S. PATENT DOCUMENTS

| | | | | |
|---|---|---|---|---|
| 6,025,850 A | * | 2/2000 | Gupta | G06T 7/12 345/442 |
| 6,252,579 B1 | * | 6/2001 | Rosenberg | G06F 3/016 345/157 |
| 8,103,093 B2 | | 1/2012 | Blake et al. | |
| 8,280,171 B2 | * | 10/2012 | Pettigrew | G06T 7/12 345/589 |
| 8,331,685 B2 | * | 12/2012 | Pettigrew | G06T 7/13 345/619 |
| 8,386,964 B2 | | 2/2013 | Sun et al. | |
| 8,391,594 B1 | * | 3/2013 | Wang | G06T 7/194 382/100 |
| 8,452,105 B2 | * | 5/2013 | Pettigrew | G06K 9/342 345/619 |
| 8,498,481 B2 | | 7/2013 | Blake et al. | |

(Continued)

OTHER PUBLICATIONS

"Roto Brush, Refine Edge, and Refine Matte effects | CC", https://helpx.adobe.com/after-effects/using/roto-brush-refine-edge.html, Published on: Sep. 29, 2013, 12 pages.

*Primary Examiner* — Ryan P Potts

(57) ABSTRACT

An image segmentation apparatus comprises a processor which receives user input specifying a boundary of a region of interest of an image. The processor determines speed of the user input. A segmentation component maps the speed of the user input to a width of an area associated with the boundary of the region of interest. The segmentation component is configured to extract training data from the image on the basis of the area, and to train a segmentation model using the extracted training data. The segmentation component is configured to process image elements of the area using the trained segmentation model in order to compute an indication whether the image elements are to be assigned to the region of interest or not.

20 Claims, 6 Drawing Sheets

(56) References Cited

U.S. PATENT DOCUMENTS

| | | |
|---|---|---|
| 8,548,251 B2 * | 10/2013 | Pettigrew .............. G06T 7/149 |
| | | 382/199 |
| 2003/0004678 A1 * | 1/2003 | Zhang .................. G06F 3/0425 |
| | | 702/152 |
| 2006/0039611 A1 * | 2/2006 | Rother ................. H04N 5/275 |
| | | 382/199 |
| 2007/0147678 A1 | 6/2007 | Gotting et al. |
| 2007/0268304 A1 | 11/2007 | Hsu |
| 2008/0136820 A1 | 6/2008 | Yang et al. |
| 2008/0260221 A1 | 10/2008 | Unal et al. |
| 2009/0297035 A1 * | 12/2009 | Pettigrew ................ G06T 7/12 |
| | | 382/199 |
| 2011/0214044 A1 | 9/2011 | Davis et al. |
| 2012/0020554 A1 * | 1/2012 | Sun ......................... G06T 7/11 |
| | | 382/164 |
| 2013/0009989 A1 | 1/2013 | Chen et al. |
| 2014/0119656 A1 | 5/2014 | Lilje et al. |
| 2015/0153897 A1 | 6/2015 | Huang et al. |
| 2015/0294476 A1 | 10/2015 | Tang et al. |
| 2015/0334398 A1 | 11/2015 | Socek et al. |

* cited by examiner

FIG. 2A
FIG. 2B
FIG. 2C
FIG. 2

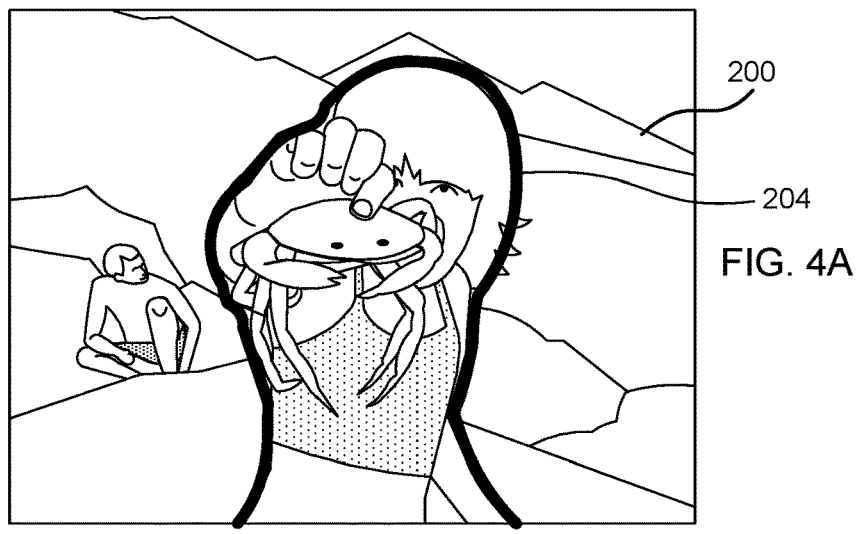
FIG. 4A
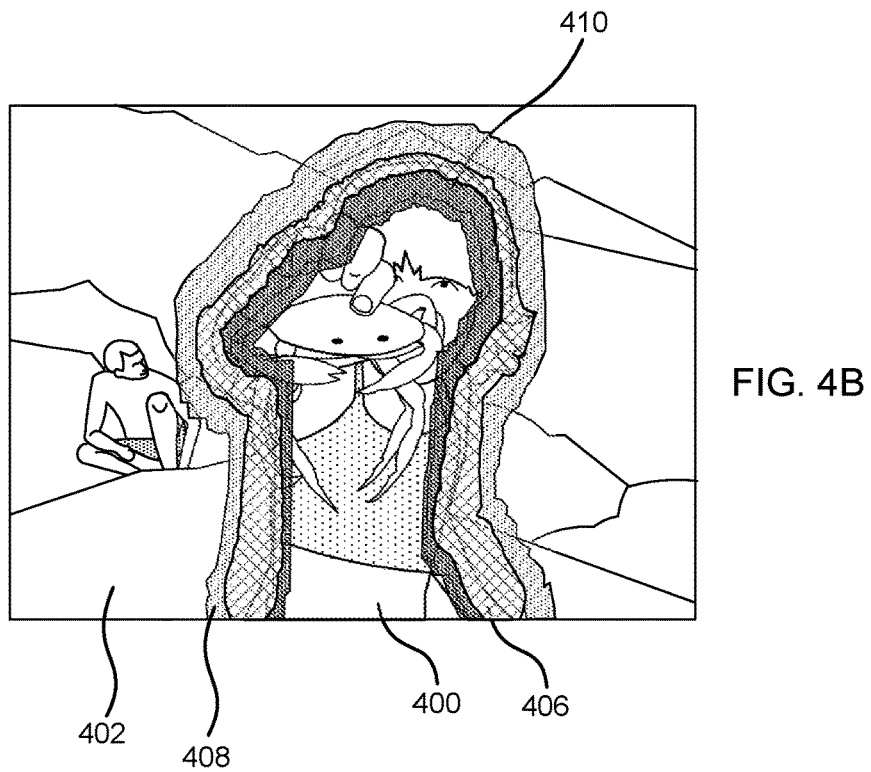
FIG. 4B
FIG. 4

IMAGE SEGMENTATION USING USER INPUT SPEED

BACKGROUND

Foreground/background image segmentation is a process whereby regions in an image which depict foreground are separated from regions depicting background. Image segmentation can be thought of as a type of labeling process whereby image elements are labeled as depicting foreground or background, or as depicting objects of particular classes or categories.

Image segmentation is useful for many different purposes including image editing and to provide input to a downstream image processing facility. In the case of image editing, end users often desire to segment out a foreground region of an image in order to apply image processing to that foreground independently of the background region. For example, to adjust color balance of the foreground region, to carry out super-resolution on the foreground region, to add the foreground region to another image to form a composite image, to perform blurring on the background region to achieve an artificial depth of field, or for other purposes. The images themselves are digital still images, images which are part of a video, or other types of images including medical images, depth images, or others.

The embodiments described below are not limited to implementations which solve any or all of the disadvantages of known image segmentation apparatus.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An image segmentation apparatus is described which comprises a processor which receives user input specifying a boundary of a region of interest of an image. The processor determines speed of the user input. A segmentation component maps the speed of the user input to a width of an area associated with the boundary of the region of interest. The segmentation component is configured to extract training data from the image on the basis of the area, and to train a segmentation model using the extracted training data. The segmentation component is configured to process image elements of the area using the trained segmentation model in order to compute an indication whether the image elements are to be assigned to the region of interest or not.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 2A is a line drawing of an image captured using the tablet computer of FIG. 1;

FIG. 2B is the line drawing of FIG. 2A and showing a line drawn by a user around a region of interest;

FIG. 2C is a line drawing representing an image of a segmented region of interest obtained from the image of FIG. 2B;

FIG. 4A is a schematic diagram of an image showing a line drawn by a user around a region of interest;

FIG. 4B is a schematic diagram of the image of FIG. 4A and showing an unknown area of the image;

Like reference numerals are used to designate like parts in the accompanying drawings.

DETAILED DESCRIPTION

Figure 1:
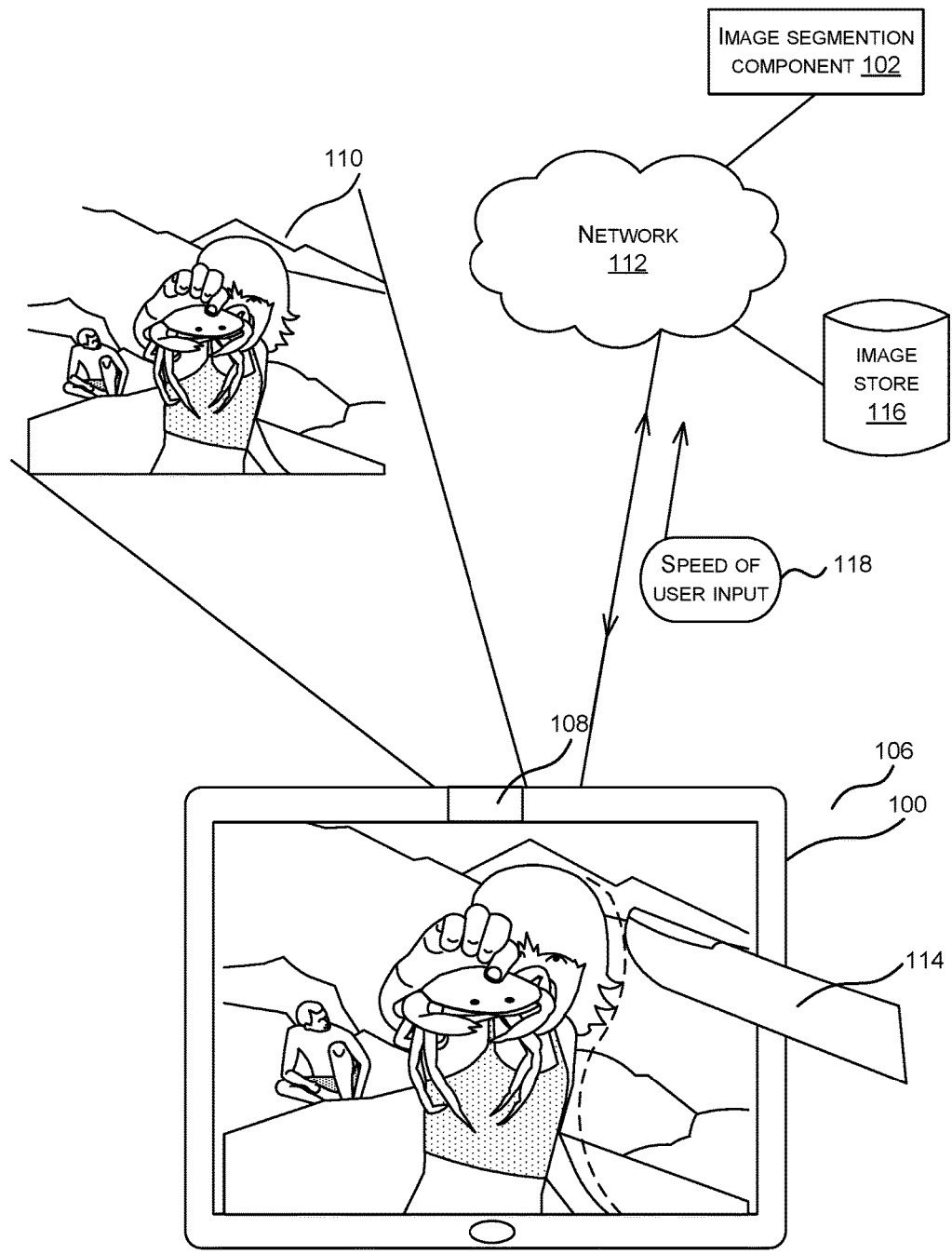
FIG. 1 is a schematic diagram of a user drawing a line around a region of interest of an image using a touchscreen of a tablet computing device.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The inventor has recognized that obtaining training data to train a segmentation model for image segmentation is a difficult task which is time consuming and expensive. Typically a segmentation model is trained in an offline process using many training examples and is later used to segment images that have not previously been available to the segmentation model. As the quality, variety and amount of training data affects the quality of the trained segmentation model, there is an ongoing need to obtain good training data in a simple, effective manner. The inventor has identified a way to obtain such training data by using information gained implicitly as well as explicitly from user input. Training is carried out each time an individual image is to be segmented.

Information is gained implicitly from user input by measuring speed of user input, where that user input specifies a boundary of a region of interest in an image. The user understands that he or she is specifying the boundary which is to be given as input to an image segmentation apparatus. However, the user may be unaware that the speed of his or her user input is being taken into account. This reduces the burden on the user whilst at the same time facilitating high quality image segmentation.

An area associated with the boundary is determined based on the speed of the user input. In some cases, the area is a band encompassing the boundary and extending on either side of the boundary. The area has a width which may vary along a length of the area according to the speed of the user input which specified the boundary in some examples as described in more detail below. The area can be referred to as an "unknown area" as it is an area within which it is uncertain whether image elements depict the region of interest or not.

Training data is obtained from the image in dependence on the area associated with the boundary, and thus in dependence on the speed of the user input. In this way, the user input speed affects the quality of the training examples in terms of their ability to train a segmentor for the task of segmenting the true region of interest. For example, where the speed of the user input is high the accuracy of the boundary is assumed to be low. In this case the training data examples are taken from regions of the image further away from the boundary than in the case where the speed of the user input is lower. Training data examples which are taken from regions closer to the boundary are assumed to have larger risk to by accident end up on the wrong side of the boundary provided by the user, unless the user input is slow, in which case the user has more accurately specified the boundary.

Training data comprising image elements labeled as being in the region of interest are taken from the image within a range of one side of the "unknown" area and image elements labeled as being not in the region of interest are taken from the image within a range of another side of the "unknown" area.

FIG. 1 shows an end user computing device 106 such as a tablet computer, smart phone, digital camera, head worn computing device or other end user electronic device. In the example of FIG. 1 the end user computing device 106 has a camera 108 which has captured an image of a scene 110. The captured image is displayed at a display screen 100 of the end user computing device which is a touch screen in this example. The image depicts a girl holding a crab where the girl is standing in front of rocks on a beach. The end user touches the display screen 100 with his or her finger 114 to draw a boundary 104 around the girl where the girl is a region of interest to be segmented from the image.

An image segmentation component 102 connected to the end user computing device 106 via a network 112 receives the image as well as details of the user input including the speed of the user input 118 and the location of the user input in the image. The image segmentation component 102 segments a region of interest from the image 100 using the speed of the user input 118 and returns the segmented region of interest to the end user computing device 106.

More detail about the image segmentation component 102 is given later in this document. In some examples the end user computing device has no camera and the image is obtained from an image store 116 connected to network 112 or located at the end user computing device 106. In some examples the image segmentation component 102 is at the end user computing device 106. It is understood that the functionality of the image segmentation component 102 is distributed between the end user computing device 106 and one or more other entities connected to network 112 in some cases.

FIG. 2A is a schematic diagram of an image 200 to be segmented. The image 200 is displayed, for example on a display screen or by being projected onto a surface or into an eye of a user. The user makes user input to specify a boundary of a region of interest of the image 200 as indicated in FIG. 2B. For example, the user draws line 204 around the region of interest using a mouse, stylus, finger, laser pointer, eye movement, hand gesture or other mode of user input. A speed of the user input is measured or computed, for example by using user input event data from an operating system of a computing device controlling display of the image 200. The speed of the user input may vary over a length of the boundary or may be computed as an aggregated speed over the boundary.

An image segmentation apparatus segments the image 200 to extract a region of interest 206 such as that shown in FIG. 2C. The image segmentation apparatus uses the speed of the user input as described in more detail below. Note that the segmentation apparatus has correctly been able to include the crab and the girl in the region of interest despite the color of the crab being different from the color of the girl and similar to the color of the background rocks.

Figure 3:
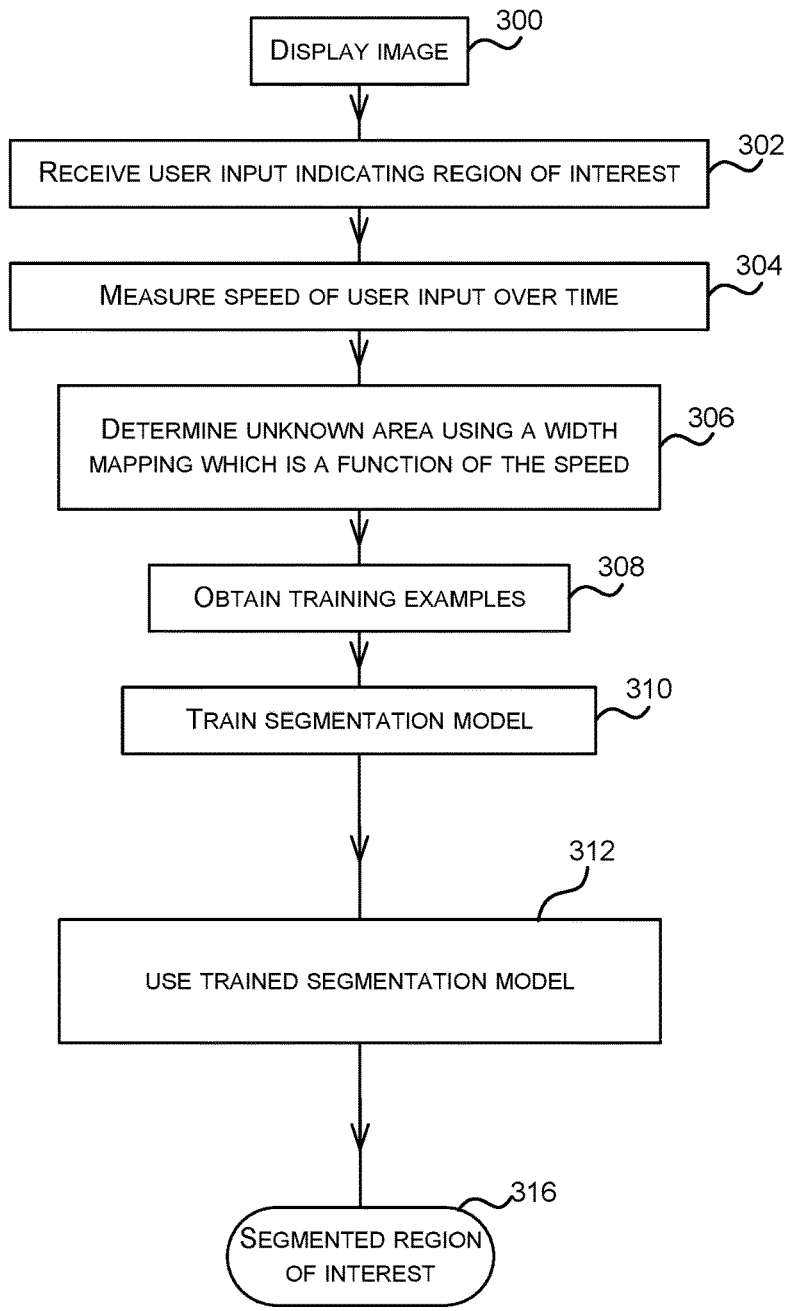
FIG. 3 is a flow diagram of a method at a segmentation component of an electronic device.

FIG. 3 is a flow diagram of a method of image segmentation which may be implemented at the end user device 106 of FIG. 1 or, at least in part, at the image segmentation component 102 of FIG. 1.

An image is displayed 300 such as image 200 of FIG. 2A. User input is received 302 indicating a region of interest. For example, the user input specifies a boundary comprising a line in the image around the region of interest. A speed of the user input is measured 304 or computed over time. For example, user input event data is obtained from an operating system of a computing device according to one or more of: movement of a mouse, movement of a joystick, movement of a game controller, movement of a finger on a touchscreen, gesture movement detected using depth cameras or in other ways, eye movements, or other user input. For example, the speed of the user input is computed for a plurality of individual points on the boundary.

In some examples the speed of the user input is smoothed by combining speed values of two or more subsequent points on the boundary. This enables small scale random variation in the speed, due to noise in the user input data and/or jitter of the user input such as hand shake, to be removed so as to improve accuracy.

In some examples the speed values are combined using a scaling factor to control responsiveness to speed changes. For example the speed is calculated using the following update equation using the scaling factor f which is a constant that is modified (by user settings or by automatic configuration) depending on how responsive the image segmentation apparatus is to be to speed changes.

$$V_{new} = f \times V_{current} + (1-f) V_{old}$$

Which may be expressed in words as, the velocity used for calculating the width of the "unknown" area at a current point on the boundary is equal to the scaling factor times the current user input velocity plus the velocity used for calculating the width of the "unknown" area at the previous point on the boundary times one minus the scaling factor. The scaling factor is automatically configured in some cases, by detecting the mode of user input being used and selecting a value of the scaling factor from a look up table according to the mode of user input.

Returning to FIG. 3, a segmentation component maps 306 the speed of the user input to a width of an area associated with the boundary of the region of interest. The area is referred to herein as an "unknown area" since it is an area of the image in which it is unknown whether image elements depict the region of interest or not. In some examples the unknown area substantially covers the boundary and extends either side of the boundary.

The mapping is carried out using a width mapping which is a function of the speed of the user input. In an example, the width depends on the speed of input within certain limits, for slow speeds a minimum width is used and for large speeds a maximum width is used. By using a linear mapping a simple and effective mapping is implemented which controls the width of the unknown area in a manner found to give good segmentation results; however, it is not essential to use a linear mapping. By using a specified upper and lower value of the width the unknown area is controlled within specified limits and to give good working results in a practical time scale.

In some examples the segmentation component maps the speed of the user input to the width of the area after scaling the speed of the user input using a scaling factor which is selected according to one or more of: a type of the user input, user behavior, a type of an electronic device comprising the image segmentation apparatus. By using a scaling factor it is possible to take into account variation in user input behavior, variation in the mode of user input, and variation in the type of the electronic device such as the amount of processing power available. The scaling factor enables this control to be achieved in a simple and effective manner.

In some examples the segmentation component maps the speed of the user input to the width of the area using a mapping selected from a plurality of available mappings according to selection criteria being one or more of: a type of the user input, an identifier of the user. By using different mappings for different situations in this way improved segmentation accuracy is achieved by using an appropriate mapping for the particular situation.

An example of a width mapping is:

$$w=\min(w_{max},\max(w_{min}, V \times p))$$

Which is expressed in words as, the width of the unknown area at a given point on the boundary is equal to the minimum of: a specified maximum width and the result of the maximum of a specified minimum width and the user input speed V at the given point on the boundary times a scaling factor p. The scaling factor p is selected according to one or more of: a type of the user input, user behavior, a type of an electronic device comprising the image segmentation apparatus.

Returning to FIG. 3 the segmentation component obtains 308 training examples from the image. For example, the training examples are labeled image elements of the image, where the labels indicate membership of the region of interest or not. The segmentation component is configured to extract training data from the image on the basis of the unknown area, and to train 310 a segmentation model using the extracted training data. In an example, the training data is obtained from the image by selecting points falling within a range extending outwards from the unknown area as being known non-region of interest points, and selecting points falling within a specified range extending inwards from the area as being known region of interest points. The range is a fixed range in some examples.

The training data is used to train a segmentation model (see box 310 of FIG. 3). For example, the segmentation model comprises a statistical model such as a mixture model which is formed using the training data. The statistical model is then used to process the image elements of the unknown area, so each pixel is assigned a probability to be a part of the region of interest. From this field of probability values (formed from the probability values calculated for the pixels of the unknown region using the mixture model and probability values assigned to other pixels of the input image a probable binary mask is calculated, assuming that close pixels with similar features correlate strongly and that the binary mask therefore is forced to change where changes occur in the image. In this way the image elements of the unknown area either become part of the region of interest or do not. The output of the segmentation model is used to give a segmented region of interest 316.

The statistical model comprises a mixture model in some cases which is a model of the probability that a specific color is a part of the region of interest or a part of the background. The statistical model is formed using the training data obtained at operation 308. However, it is not essential to use a mixture model based on color. Statistical models of other image modalities such as texture or structure may be used. Statistical models of one or more combinations of color, texture, structure may be used. In examples, the segmentation model comprises a trained classifier such as a neural network, random decision forest, support vector machine or other trained classifier.

The process for computing the binary mask takes into account spatial relationships in the image whereas the mixture model is a local model. A Markov random field solver, using a Graph Cut algorithm is used to compute the binary mask from the field of probabilities in some cases. After the segmented region of interest 318 is available and displayed to the user it is possible for the user to improve the segmentation by changing the user input boundary drawn on the input image so that the process of FIG. 3 repeats. It is also possible for the user to directly edit the output region of interest 318.

The process of FIG. 3 may be carried out for a low resolution version of the input image and then the output region of interest 318 is processed to increase its resolution using any well known super-resolution or matting process. This enables the process of FIG. 3 to be carried out even where processing resources are limited.

In an example, described with reference to FIG. 4A and FIG. 4B, a user has input line 204 indicating a boundary of a region of interest which in this case depicts a girl holding a crab. The image segmentation apparatus computes a speed of the user input and finds this to be faster on the sides of the girl's body than around her head. The image segmentation apparatus computes an unknown area 406 which covers the boundary and extends either side of the boundary. The width of the unknown area 406 is wider at the sides of the girl's body than around her head since the speed of the user input was faster at the sides of the girl's body. The training data is selected from two areas indicated as 408 and 410 in FIG. 4B. The area 410 towards the center of the image comprises image elements which are labeled as depicting the region of interest. The area 408 away from the centre of the image comprises image elements which are labeled as not depicting the region of interest. The training data from areas 408 and 410 is used to train the segmentation model.

The trained segmentation model is applied to the image elements in the unknown area 406 to give probability values indicating the likelihood those image elements are members of the region of interest. The image elements in region 400 which is inside the boundary and closer to the center of the image than the training data, are labeled as having a very high probability of depicting the region of interest. The image elements in the region 402 which is outside the boundary and outside the training data, are labeled as having a very high probability of not depicting the region of interest. The labeled image elements are input to a Markov random field model which is solved using graph cut or another well known algorithm for solving random field models, to find an updated region of interest.

Figure 5:
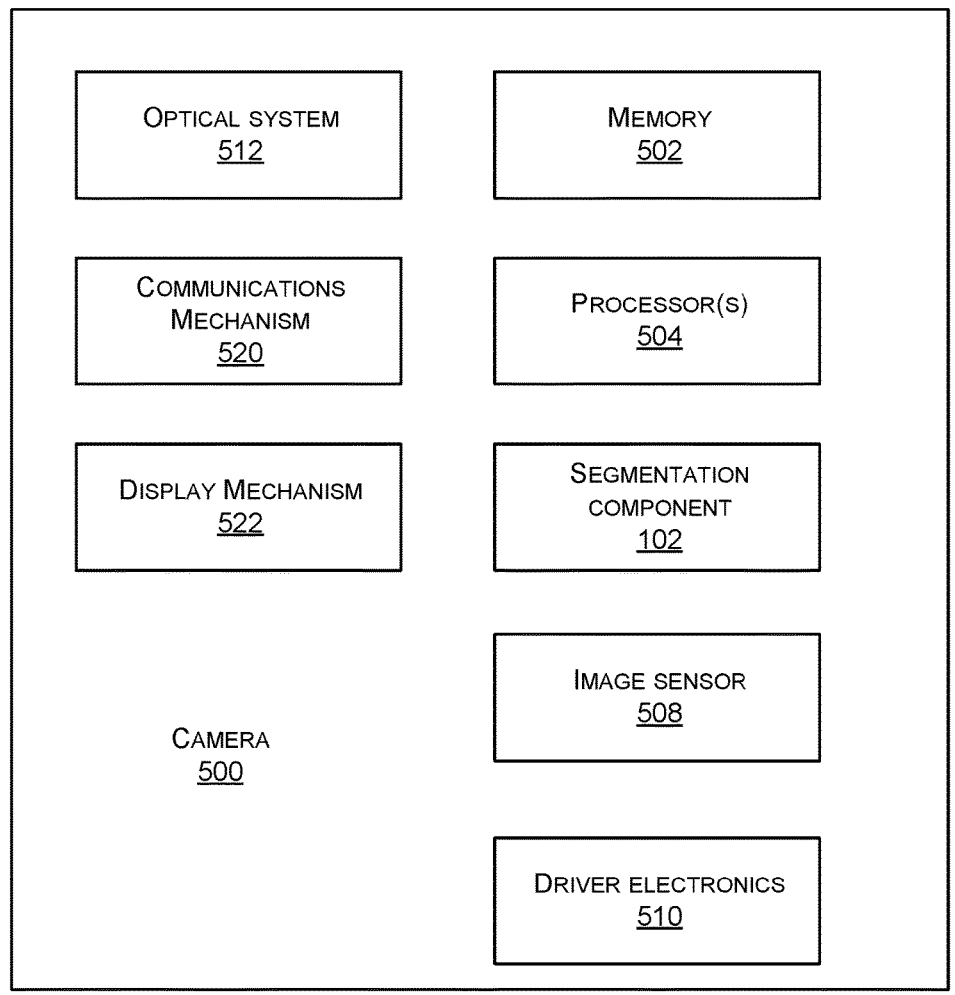
FIG. 5 is a schematic diagram of a camera comprising a segmentation component.

In some examples the segmentation component 102 is integral with a digital camera 500 as now described with reference to FIG. 5.

A digital camera 500 comprises an image sensor 508 that receives light reflected from objects within the scene. The image sensor 508 comprises a charge-coupled device (CCD) sensor, a complementary metal-oxide-semiconductor (CMOS) sensor, for example a Photonic Mixer Device (PMD) sensor or other appropriate sensor which is arranged to detect light reflected and emitted from objects, people and surfaces within the camera range.

The camera comprises an optical system 512 that is arranged to gather and focus reflected light from the environment on to the image sensor 508. The camera comprises driver electronics 510 which control the image sensor 508 and the optical system 512. An image sensor may be shuttered on and off electronically rather than with physical shutters.

In one example the camera comprises a processor 504 and a memory 520 which stores sensor data from the image sensor 508. Where, a segmentation component 120 is at the camera it comprises software stored at memory 502 and executed at processor 504 in some cases. In some examples the segmentation component 102 is a field programmable gate array (FPGA) or a dedicated chip. For example, the functionality of the segmentation component 102 is implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The camera 500 has a communications mechanism 520 in some examples to enable it to send the images it captures to another entity. The camera 500 has a display mechanism 522 in some examples to enable it to display the output region of interest images from the segmentation component 102 at a display associated with the camera 500.

Figure 6:
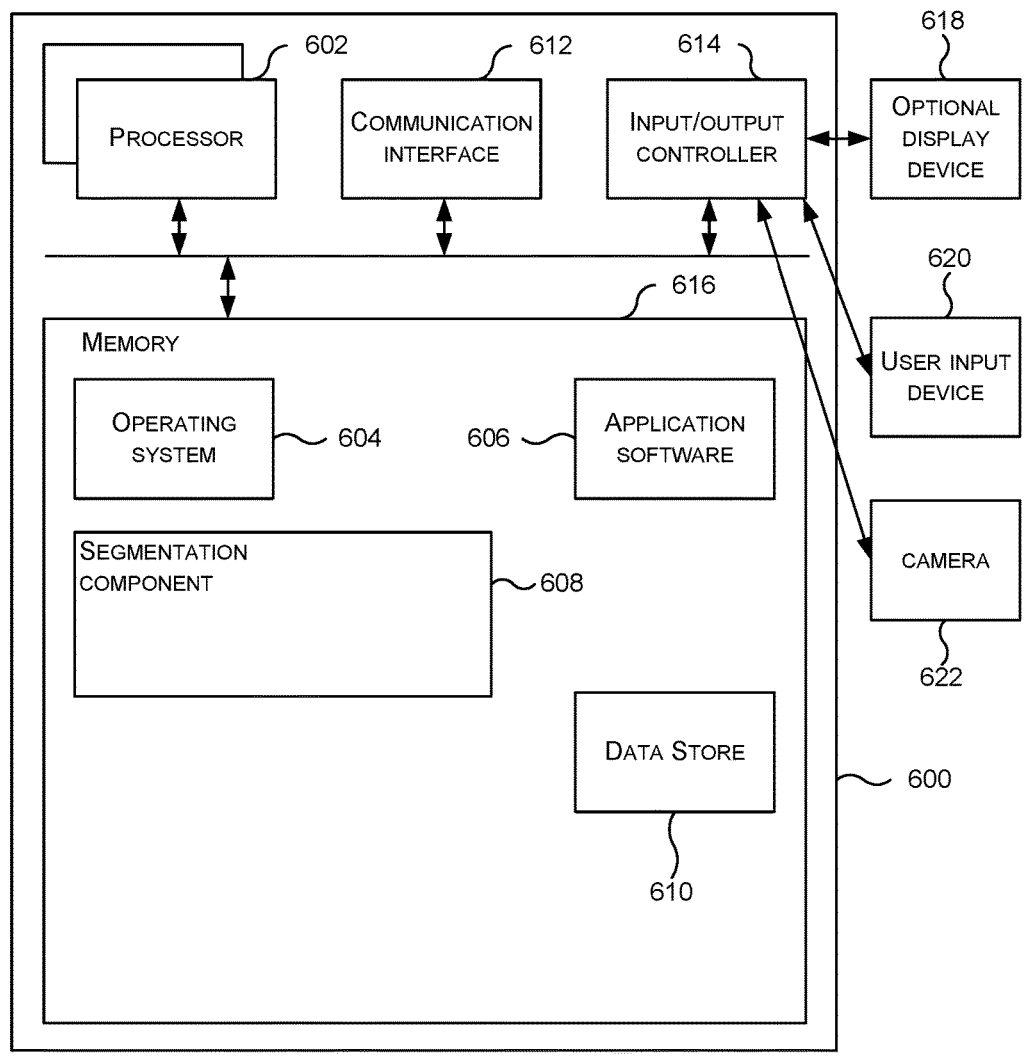
FIG. 6 is a schematic diagram of an exemplary computing-based device in which embodiments of an image segmentation component are implemented.

FIG. 6 illustrates various components of an exemplary computing-based device 600 which are implemented as any form of a computing and/or electronic device, and in which embodiments of a segmentation component for extracting regions of interest from an image are implemented in some examples.

Computing-based device 600 comprises one or more processors 602 which are microprocessors, controllers or any other suitable type of processors for processing computer executable instructions to control the operation of the device in order to carry out segmentation. In some examples, for example where a system on a chip architecture is used, the processors 602 include one or more fixed function blocks (also referred to as accelerators) which implement a part of the method of FIG. 3 in hardware (rather than software or firmware). Platform software comprising an operating system 604 or any other suitable platform software is provided at the computing-based device to enable application software 606 to be executed on the device. A segmentation component 608 comprising software stored in memory 616 for execution on processors 602 is available in some cases to carry out the method of at least part of FIG. 3. A data store 610 holds images, rules, mappings, look up tables, scaling factors, user input speeds, sensor data or other information.

The computer executable instructions are provided using any computer-readable media that is accessible by computing based device 600. Computer-readable media includes, for example, computer storage media such as memory 616 and communications media. Computer storage media, such as memory 616, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 616) is shown within the computing-based device 600 it will be appreciated that the storage is, in some examples, distributed or located remotely and accessed via a network or other communication link (e.g. using communication interface 612).

The computing-based device 600 also comprises an input/output controller 614 arranged to output display information to a display device 618 which may be separate from or integral to the computing-based device 600. The display information may provide a graphical user interface. The input/output controller 614 is also arranged to receive and process input from one or more devices, such as a user input device 620 (e.g. a mouse, keyboard, camera, microphone or other sensor). In some examples the user input device 620 detects voice input, user gestures or other user actions and provides a natural user interface (NUT). This user input may be used to display output region of interest images of the segmentation component 608, input a boundary to be used by the segmentation component 608, select whether to carry out segmentation, select a number of segmentation models to be used, select values of a scaling factor. In an embodiment the display device 618 also acts as the user input device 620 if it is a touch sensitive display device. The input/output controller 614 outputs data to devices other than the display device in some examples, e.g. a locally connected printing device.

A camera 622 is connected to the input/output controller 614 in some examples and captures images to be segmented.

Any of the input/output controller 614, display device 618 and the user input device 620 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

The examples illustrated and described herein as well as examples not specifically described herein but within the scope of aspects of the disclosure constitute exemplary means for segmenting an image. For example, the operating system 604 and/or processor 602 comprises exemplary means for receiving user input specifying a boundary of a region of interest of an image.

For example, the processor 602, when encoded with instructions implementing the method of at least part of FIG. 3 comprises exemplary means for determining speed of the user input at a plurality of points on the boundary, exemplary means for mapping the speed of the user input to a width of an area associated with the boundary of the region of interest such that the width of the area varies along a length of the area, exemplary means for extracting training data from the image by selecting points outside the area, exemplary means for training a segmentation model using the extracted training data; and exemplary means for processing image elements of the area using the trained segmentation model in order to compute an indication whether the image elements are to be assigned to the region of interest or not.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An image segmentation apparatus comprising:
a processor which receives user input specifying a boundary of a region of interest of an image;
the processor determining speed of the user input;
the processor configured to act as a segmentation component which maps the speed of the user input to a width of an area associated with the boundary of the region of interest, wherein the width changes based on a change in speed of the user input, and
the segmentation component configured to extract training data from the image based on the area, and to train a segmentation model using the extracted training data, the training data comprising image elements labeled as being in the region of interest taken from the image within a first range of one side of the area and image elements labeled as being not in the region of interest taken from the image within a second range of another side of the area; and
the segmentation component configured to process image elements of the area using the trained segmentation model in order to compute an indication whether the image elements are to be assigned to the region of interest or not.

2. The image segmentation apparatus of claim 1 wherein the processor determines the speed of the user input at a plurality of points on the boundary and wherein the segmentation component maps each of the speeds to a width of the area such that the width of the area varies along a length of the area.

3. The image segmentation apparatus of claim 2 wherein the processor is configured to combine speed values of two or more subsequent points on the boundary.

4. The image segmentation apparatus of claim 3 wherein the processor combines the speed values using a scaling factor to control responsiveness to speed changes.

5. The image segmentation apparatus of claim 1 wherein the area covers the boundary and extends either side of the boundary.

6. The image segmentation apparatus of claim 1 wherein the segmentation component maps the speed of the user input to the width of the area using a mapping which gives a value between a specified upper and lower value of the width.

7. The image segmentation apparatus of claim 1 wherein the segmentation component maps the speed of the user input to the width of the area after scaling the speed of the user input using a scaling factor which is selected according to one or more of: a type of the user input, user behavior, or a type of an electronic device comprising the image segmentation apparatus.

8. The image segmentation apparatus of claim 1 wherein the segmentation component maps the speed of the user input to the width of the area using a mapping selected from a plurality of available mappings according to selection criteria being one or more of: a type of the user input or an identifier of the user.

9. The image segmentation apparatus of claim 1 wherein the processor is configured to compute the speed of the user input using user input event data obtained from an operating system of the image segmentation apparatus.

10. The image segmentation apparatus of claim 1 wherein the segmentation model comprises a statistical model used to assign a probability that pixels are part of the region of interest, and the statistical model is based on one of color, texture, or structure.

11. The image segmentation apparatus of claim 10 wherein the segmentation component extracts the training data from the image by selecting a first plurality of points falling within the second range extending outwards from the area as being typical non-region of interest and labeled as not in the region of interest, and extracts the training data from the image by selecting a second plurality of points falling within the first range extending inwards from the area as being typical region of interest points and labeled as being in the region of interest, wherein the first and second ranges are fixed.

12. The image segmentation apparatus of claim 1 wherein the first and second ranges are different.

13. The image segmentation apparatus of claim 1 wherein the first and second ranges are the same.

14. A computer-implemented method comprising:
receiving user input specifying a boundary of a region of interest of an image;
determining, using a processor, speed of the user input;
mapping the speed of the user input to a width of an area associated with the boundary of the region of interest, wherein the width changes based on a change in speed of the user input,
extracting training data from the image based on the area, the training data comprising image elements labeled as being in the region of interest taken from the image within a first range of one side of the area and image elements labeled as being not in the region of interest taken from the image within a second range of another side of the area;
training a segmentation model using the extracted training data; and
processing image elements of the area using the trained segmentation model in order to compute an indication whether the image elements are to be assigned to the region of interest or not.

15. An image segmentation apparatus comprising:
means for receiving user input specifying a boundary of a region of interest of an image;
means for determining speed of the user input at a plurality of points on the boundary;
means for mapping the speed of the user input to a width of an area associated with the boundary of the region of interest such that the width of the area varies along a length of the area, wherein the width changes based on a change in speed of the user input,
means for extracting training data from the image by selecting points outside the area, the training data comprising image elements labeled as being in the region of interest taken from the image within a first range of one side of the area and image elements labeled as being not in the region of interest taken from the image within a second range of another side of the area;
means for training a segmentation model using the extracted training data; and
means for processing image elements of the area using the trained segmentation model in order to compute an indication whether the image elements are to be assigned to the region of interest or not.

16. The image segmentation apparatus of claim 15 wherein the area covers the boundary and extends either side of the boundary.

17. The image segmentation apparatus of claim 15 wherein the means for mapping maps the speed of the user input to the width of the area using a mapping which gives a value between a specified upper and lower value of the width.

18. The image segmentation apparatus of claim 15 wherein the means for mapping maps the speed of the user input to the width of the area using a mapping selected from a plurality of available mappings according to selection criteria being one or more of: a type of the user input or an identifier of the user.

19. The image segmentation apparatus of claim 15 wherein the means for extracting training data extracts the training data from the image by selecting a first plurality of points falling within a range extending outwards from the area as being typical non-region of interest points.

20. The image segmentation apparatus of claim 19 wherein the means for extracting training data extracts the training data from the image by selecting a second plurality of points falling within a second range extending inwards from the area as being typical region of interest points.

* * * * *